United States Patent [19]
Ekhoff

[11] Patent Number: 5,920,443
[45] Date of Patent: Jul. 6, 1999

[54] DISK DRIVE ASSEMBLY AND METHOD HAVING DIRECT AERODYNAMIC DISK SUPPORT

[76] Inventor: Donald L. Ekhoff, 15105 Concord Cir., Morgan Hill, Calif. 95037

[21] Appl. No.: 08/929,720

[22] Filed: Sep. 15, 1997

[51] Int. Cl.⁶ .............................. G11B 17/02; G11B 17/08
[52] U.S. Cl. ...................................... 360/99.08; 360/98.07
[58] Field of Search .............................. 360/98.07, 99.04, 360/99.08, 99.12; 369/100, 107, 112, 121, 123

[56] References Cited

U.S. PATENT DOCUMENTS

| | | | |
|---|---|---|---|
| 4,622,618 | 11/1986 | Oishi et al. | 360/128 |
| 5,112,142 | 5/1992 | Titcomb et al. | 384/107 |
| 5,358,339 | 10/1994 | Konno et al. | 384/107 |
| 5,423,612 | 6/1995 | Zang et al. | 384/119 |
| 5,516,212 | 5/1996 | Titcomb | 384/107 |
| 5,536,088 | 7/1996 | Cheever et al. | 384/107 |

FOREIGN PATENT DOCUMENTS 62-31080  2/1987  Japan .

OTHER PUBLICATIONS

Liebler, Kenneth A., "Future trends in spindle bearings for disk drives," *Data Storage*, Nov./Dec. 1995, pp. 37–40.

*Primary Examiner*—Allen T. Cao
*Attorney, Agent, or Firm*—Terry McHugh

[57] ABSTRACT

A disk drive assembly and method include an aerodynamic thrust bearing that utilizes a surface of a data storage disk to define the plane of rotation for the disk surface. The data disk is positioned to contact at least one air pad when the disk is in a rest position, but is supported by an air bearing when the disk is rotated. In one embodiment, there are three air pads formed on a thrust bearing ring. This drive assembly also includes a hydrodynamic journal bearing in which a journal fluid is retained between a rotating shaft and a stationary sleeve. Surface features of the shaft create dynamic pressures along the interface between the shaft and the sleeve, dissipate hydrodynamic kinetic energy at the peripheries of the active journal region, accommodate resupply of the journal fluid to the central portion of the active region, and define capillary seals to inhibit migration of the journal fluid.

20 Claims, 4 Drawing Sheets

DISK DRIVE ASSEMBLY AND METHOD HAVING DIRECT AERODYNAMIC DISK SUPPORT

TECHNICAL FIELD

The invention relates generally to assemblies and methods for supporting and driving data storage disks and more particularly to bearing systems of a data disk drive.

BACKGROUND ART

Information is stored in concentric tracks on opposite sides of a data storage disk. The information is accessed by a combination of movement of a read/write head to a particular track and rotation of the disk to the segment of the track that contains the desired information. Track seeking may be executed by linear actuation in which the read/write heads are moved radially along the opposite sides of the data storage disk or may be implemented mented using rotary actuation in which the read/write heads are mounted to an arm assembly that is pivoted at an end that is opposite to the heads.

Disk rotation is achieved by a disk drive assembly that conventionally includes a stationary shaft and a rotating sleeve to which the data disk or a stack of data disks is coupled. The sleeve is motor driven to precisely cisely position a track segment relative to a read/write head. As the density of data on the disks increases, the requirement of precise positioning is also increased. Consequently, spindle bearings for disk drive assemblies have received increasing attention. Spindle bearings must accommodate both the radial loads and the axial loads of a disk drive in which rapid accelerations and decelerations are critical.

The conventional approach to providing bearings for a disk drive assembly is to utilize ball bearings. However, such contact bearings are associated with a number of concerns. Perhaps least importantly, the contact bearings generate noise which is audible at the exterior of the host computer. More importantly, for the long-term perspective, the ball bearings wear and may eventually cause failure of the disk drive assembly. The wear also generates particles which may migrate to a data disk and cause the loss of data. From a shorter term perspective, there are limitations to the precision of operation of the contact bearings. For example, contact bearings experience non-repetitive runout, i.e., a slight but unpredictable shifting of the center of rotation as a result of solid surfaces interacting in a semi-random fashion. Non-repetitive runout is primarily a radial uncertainty, but also causes some axial variability.

An alternative approach is to use hydrodynamic bearings within a disk drive assembly. U.S. Pat. No. 5,112,142 to Titcomb et al. describes a bearing assembly to provide hydrodynamic support for both radial and axial loads of a disk drive. The bearing assembly includes a first clearance space between the shaft and the sleeve of the disk drive and includes a second clearance space between a thrust plate and the sleeve. Both of the clearance spaces are filled with a liquid lubricant to separate sliding metal surfaces. The two hydrodynamic bearings reduce non-repetitive runout, particle generation, and noise. Titcomb also describes hydrodynamic bearings in U.S. Pat. No. 5,516,212. Moreover, hydraulic bearings are described in U.S. Pat. Nos. 5,536,088 to Cheever et al. and 5,423,612 to Zang et al.

A third approach is to utilize aerodynamic bearings. In an article entitled, "Future Trends in Spindle Bearings for Disk Drives," published within the November/December, 1995 volume of *Data Storage*, Kenneth A. Liebler describes a self-acting air bearing as an alternative to the use of roller and ball bearings within a disk drive. No specific structure is described and difficulties associated with air bearings are identified, but the article asserts that air bearing performance is almost invariable, due to the stable physical properties of air.

U.S. Pat. No. 5,358,339 to Konno et al. describes a disk drive that utilizes a hydrodynamic bearing to accommodate the radial load and employs a gas as a fluid for accommodating the axial load. That is, the fluid used for generating dynamic pressure in the thrust bearings is a gas, e.g. air, while the fluid used for generating dynamic pressure in the radial bearings is a lubricating liquid. A rotating sleeve functions as a bearing member for both the radial and the thrust bearings. The inside diameter of the rotating sleeve is a bearing member for the radial bearing, while the upper and lower planar surfaces of the sleeve function as bearing surfaces for the thrust bearing. The upper and lower surfaces face planar surfaces of thrust plates. The surfaces must be precisely machined in order to minimize turbulence during operation of the disk drive.

While the prior art assemblies operate well for their intended purpose, the performances of many of the devices may be further improved. For other devices, the cost may be significantly reduced.

What is needed is a low-cost, high-performance approach to providing bearings for a disk drive assembly.

SUMMARY OF THE INVENTION

A disk drive assembly is formed to provide direct aerodynamic support of a data storage disk. That is, at least one thrust bearing is positioned adjacent to a surface of a data storage disk such that an interfacial air bearing is formed at the surface of the data disk when the data disk is rotated. On the other hand, the data disk is in contact with the thrust bearing when the data disk is in a rest condition.

While not critical, there are preferably at least three thrust bearings spaced to contact a radially inward portion of the data disk. Since the thrust bearings play a role in defining the tilt axis of the disk drive assembly, the thrust bearings are preferably equidistantly spaced from the axis of the data disk. However, equidistant spacing is not critical to the invention.

In one embodiment, each thrust bearing includes a pressurizing zone and a bearing surface to define an air pad. The pressurizing zone is a tapering open region that decreases in cross sectional area in the direction of rotation of the data disk, thereby enhancing development of a load supporting air film at the interface between the data disk and the thrust bearing.

In order to facilitate the precision placement of the thrust bearings, the area of the thrust bearings may be fabricated as portions of a unitary annular ring. In this embodiment, the annular ring includes at least one relieved area that allows a read/write head to access the region of the data disk that acts as a landing zone when the disk is in the rest condition. Thus, the direct aerodynamic support of the data disk does not reduce the storage area of the disk.

In the preferred embodiment, the disk drive assembly includes a hydrodynamic journal bearing between a shaft and a sleeve. The circumference of the shaft includes a central active journal surface and tapering end portions that decrease in diameter with distance from the active journal surface to form capillary seals that retain journal fluid between the active journal surface and the sleeve. Preferably, the shaft is rotatable and the sleeve is stationary.

This arrangement in which the shaft is rotatable, rather than the sleeve, significantly reduces the likelihood of journal fluid migration as a result of centrifugal forces. The tapering end portions of the shaft form capillary seals for inhibiting axial migration. While the preferred embodiment is one in which the shaft is rotatable, many of the features of the disk drive assembly may be utilized in an embodiment in which the sleeve is rotatable relative to the shaft, e.g., the direct aerodynamic disk support.

Other features of the circumferential surface of the shaft are compression ramps, resupply grooves, and "energy kill" grooves. The compression ramps are regions along the active journal surface in which the radial dimension of the shaft varies to form ramps that provide dynamic fluid pressure for maintaining the desired relationship between the surfaces of the shaft and sleeve. The resupply grooves extend in parallel relationship to the rotational axis and are located between adjacent compression ramps to accommodate a resupply flow of fluid that has been forced to the ends of the active journal surface by the compression ramps. The energy kill grooves are annular grooves at the ends of the active journal surface, and act to create a buffer zone to allow dissipation of the fluidic kinetic energy caused by the pressure-bearing operation of the compression ramps. Energy kill grooves separate the active journal surface from the capillary seals formed by the tapering end portions of the shaft.

An advantage of the invention is that the use of the data storage disk as one member of an aerodynamic thrust bearing provides a low-cost, high-performance means of accommodating the axial load of the disk drive assembly. The data disk is necessarily highly planarized, so that there are no additional requirements on the disk as a result of using one of its surfaces to perform an air bearing. In addition to providing a "free" planar surface, the data disk is the object that is of concern in defining the planar rotation, so that acting directly upon the data disk increases the likelihood that design and operational criteria will be met. Another advantage of the invention is that the thrust bearing may be designed using techniques that are known in the industry, since read/write heads are typically suspended relative to the data disk by an air bearing when the data disk is rotated. The aerodynamic thrust bearings overcome many of the known technical, economic, and packaging problems associated with rolling bearings, such as ball bearings and rollers.

DETAILED DESCRIPTION

Figure 1:
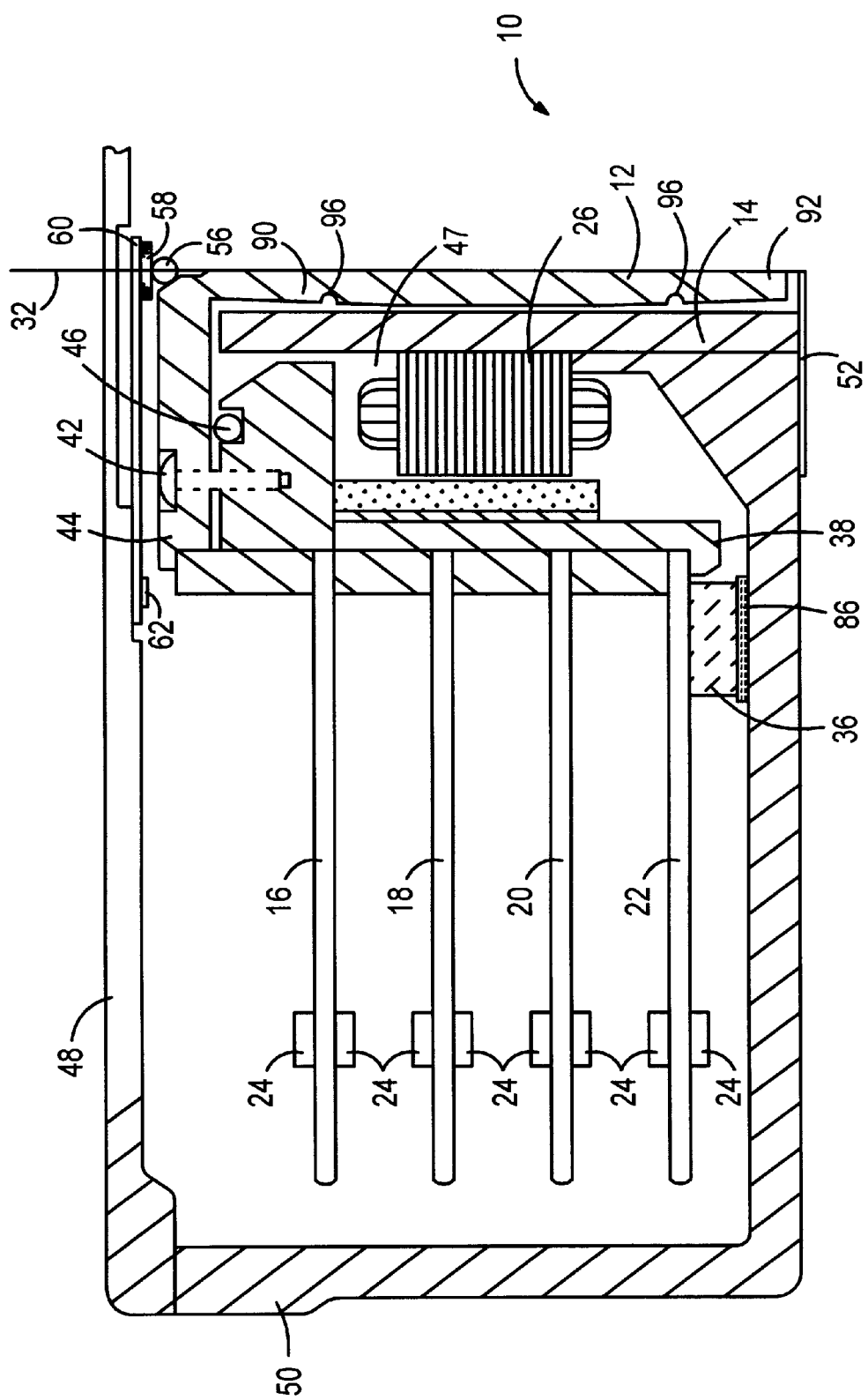
FIG. 1 is a partial side sectional view of a disk drive assembly having an aerodynamic thrust bearing and a hydrodynamic journal bearing for driving a data disk stack in accordance with the invention.

With reference to FIG. 1, a disk drive assembly 10 is shown as including a rotatable shaft 12 and a stationary sleeve 14. The spacing between the shaft and the central portion of the sleeve is filled with a journal fluid, not shown, that accommodates the radial load generated during rotation of a disk stack that is shown as including four data storage disks 16, 18, 20 and 22. In the embodiment of FIG. 1, the data disks are magnetic disks having recorded information on both major surfaces. For purposes of illustration, read/write heads 24 are included, but the actuators for moving the heads along the surfaces of the disks have been omitted. As is well known in the art, the heads are separated from the surfaces of the disks by an air bearing when the disks are rotated. While the embodiment of FIG. 1 includes a stack of data disks, the invention may be utilized to drive a single data disk.

Rotation of the shaft 12 relative to the sleeve 14 is accomplished using techniques well known in the art. A motor stator 26 is fixed to the stationary sleeve 14. An annular permanent magnet 28 is attached to a disk-support hub 30 that is coupled to the shaft 12 for rotation about the shaft axis 32. Operation of the motor stator 26 generates a flux field for driving the disk-support member 30 and the shaft 12. An annular backing 34 of mild steel shields the data disks 16–22 from stray magnetic flux by providing a flux field return.

The relative positions of the motor stator 26 and the annular permanent magnet 28 form a magnetic offset which creates an axial bias toward a thrust bearing ring 36. As will be explained more fully below, the lowermost data disk 22 is supported by air pads of the thrust bearing ring. The magnetic offset provides a magnetic preloading to allow the disk drive assembly 10 to be operated in its upright position of FIG. 1 or on its side. Moreover, the offset functions as a concession to fire-hall effect switches, if used.

The disk-support hub 30 may be an aluminum machined hub having an inside diameter that is slightly greater than the outside diameter of the annular backing 34 and having an outside diameter that is slightly less than the inside diameter of the data disks 16–22. The lowermost data disk 22 rests on the upper surface of a flange 38. Aluminum disk spacers 40 are fixed to the data disk in the positions shown in FIG. 1. Assembly screws 42 press a shoulder of a hub clamping cover 44 downwardly into contact with the uppermost disk spacer 40, so that the disk spacers and data disks are captured between the hub clamping cover and the flange 38 of the disk-support hub 30.

Adjacent to the assembly screws 42 is an o-ring 46 that is coaxial with the shaft 12. When the assembly screws are tightened in place, the o-ring is in slight compression to form a seal. In the unlikely event that journal fluid escapes from the space between the shaft 12 and the sleeve 14, the o-ring acts to prevent the journal fluid from reaching the surfaces of the data disks 16–22. The o-ring is preferably formed of rubber or other material that is absorbent toward hydrocarbons, so that any trace oil is absorbed, rather than being available for migration.

Optionally, the disk drive assembly 10 includes a filter to efficiently inhibit traces of organics that may be associated with the journal bearing. For example, the filter may be designed to prevent escaping volatiles from the journal fluid and/or outgassing adhesives that would degrade drive performance. An activated carbon filter membrane may be positioned within a fluid trap region 47 of the disk drive assembly. A particularly suitable material is a bonded-carbon filtration media available from Flanders Corp. of Washington, North Carolina. This media is referred to by Flanders Corp. as HMZD (high mass, zero dust) and was designed for use in cleanrooms of integrated circuit fabrication facilities.

The disk drive assembly includes a conventional housing. A housing cover 48 is fixed to a base member 50. While not shown in FIG. 1, the housing includes a vent to equalize the internal air pressure with the ambient air pressure. The equalization ensures that there is no pressure differential across the hydrodynamic journal bearing that will be described in detail with reference to FIGS. 4 and 5. Eliminating a pressure differential reduces the likelihood that journal fluid will be driven out from the hydrodynamic journal bearing.

In the embodiment of FIG. 1, the stationary sleeve 14 is merely a cylindrical member. The sleeve is preferably made of a stable material, such as ceramic. The sleeve may be bonded to the base member 50 of the housing in order to minimize distortion to its relatively thin walls.

After the disk drive assembly 10 has been assembled, it is possible to introduce the journal fluid into the space between the sleeve 14 and the shaft 12 from the bottom of the assembly as a final operation. The axial fill point in the base member 50 may then be sealed with an adherent disk seal 52 which also helps reduce differential pressure from developing across the hydrodynamic journal bearing.

The shaft 12 is a precision component that is fabricated from a ferrous alloy with coined or ground circumferential features that will be described in detail below with reference to FIGS. 4 and 5. The upper surface of the shaft 12 is machined to form a seat 54 for a precision ball bearing 56. The ball bearing 56 may be used as a contact for a rotary grounding button 58 that is attached to a cantilevered leaf spring flexure 60. The end of the leaf spring flexure opposite to the grounding button is attached to the housing cover 48 by a fastening member 62. Should the disk drive assembly 10 be operated on its side, the leaf spring flexure also provides a bias to maintain the disk stack alignment for properly positioning the lowermost data disk 22 in contact with the air bearing pads of the thrust bearing ring 36. However, the embodiment of the disk drive assembly shown in FIG. 1 is not designed to operate in an inverted position, since the leaf spring flexure will not adequately support the weight of the disk stack. The axial clearances are to be maintained at a minimum, so that the precision ball bearing 56 does not escape and so that any axial shift due to an impact load does not cause damage to the read/write heads 24.

The plane of rotation of the disk stack is established by the working relationship between the lowermost data disk 22 and the precision fabricated thrust bearing ring 36. When the disk stack is in the rest condition, the outer surface of the data disk 22 physically contacts the thrust bearing ring. However, rotation of the disk-support hub 30 and the shaft 12 by operation of the motor stator 26 upon the annular permanent magnet 28 creates aerodynamic pressure at the interface of the lowermost disk and the features of the thrust bearing ring. The aerodynamic pressure lifts the disk stack out of contact with the thrust bearing ring. Many of the techniques currently used to establish and maintain the spacing of the read/write heads 24 relative to the surfaces of the data disks 16–22 may be applied to the aerodynamic thrust bearing, thereby facilitating industry acceptance.

Figure 3:
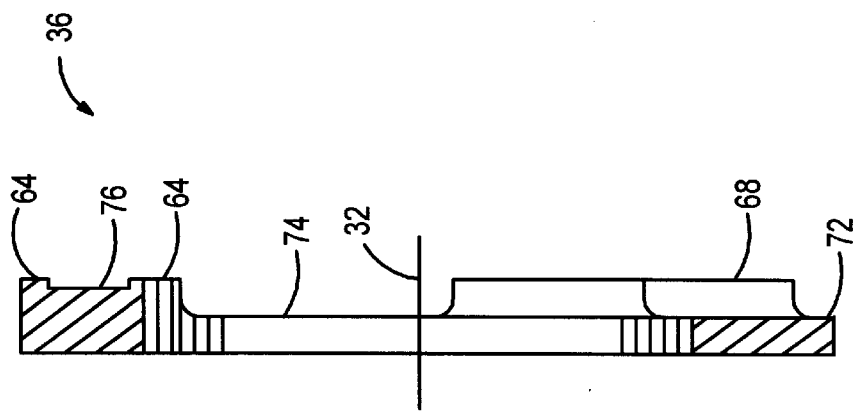
FIG. 3 is a side sectional view of the thrust bearing ring of FIG. 2, taken along lines 3—3.
Figure 2:
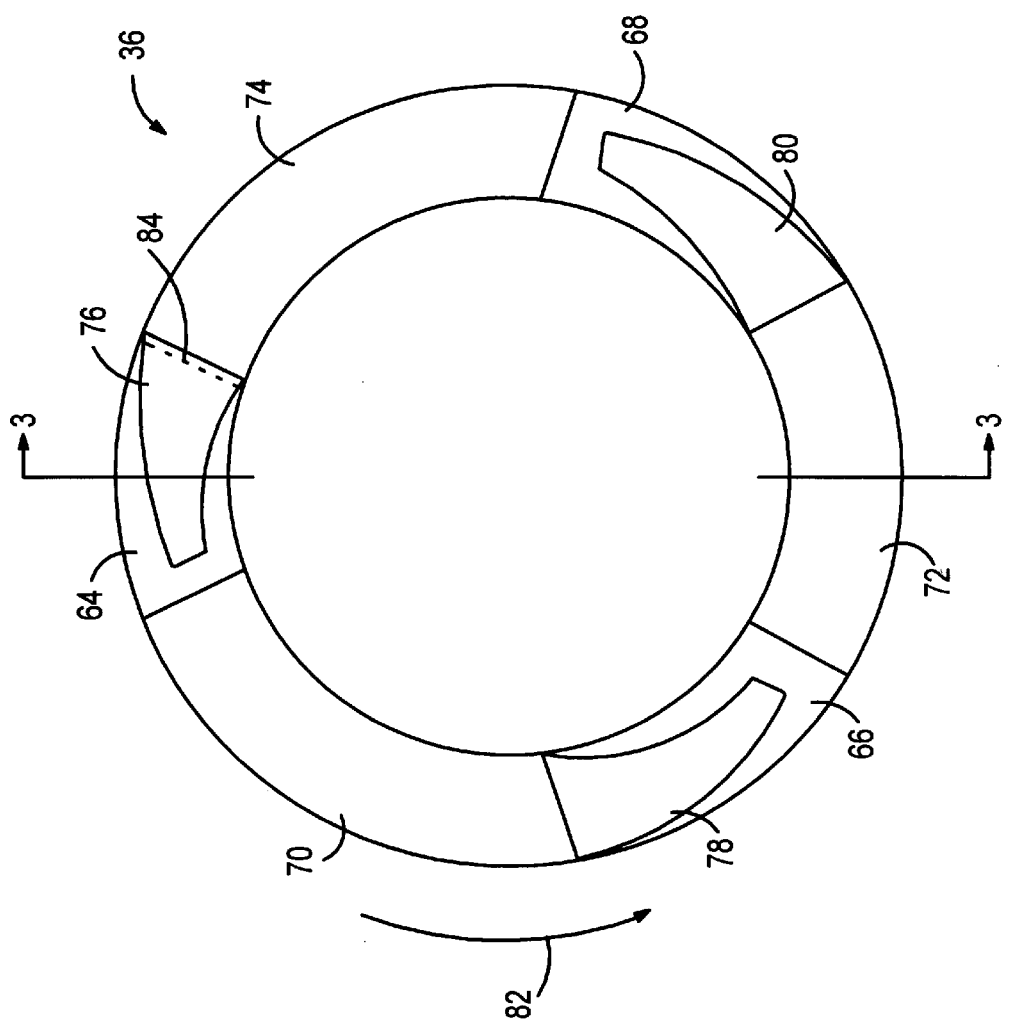
FIG. 2 is a top view of a first embodiment of a thrust bearing ring having three air pads for use in the disk drive assembly of FIG. 1.

The thrust bearing ring 36 is shown in greater detail in FIGS. 2 and 3. The one-piece structure is fabricated from a highly stable material, such as ceramic. The ring is double-disk ground in preparation for the micro machining required for forming three air pads 64, 66 and 68. Adjacent air pads are separated by relieved areas 70, 72 and 74. In operation, one of the relieved areas is used to accommodate access of the read/write head 24 to the inner portion of the surface of the lowermost disk 22 of FIG. 1. It is this inner portion that acts as a landing zone when the lowermost disk is in a rest position against the raised surface portion of the thrust bearing ring 36. Consequently, the use of the data disk 22 to provide aerodynamic thrust bearing action does not result in a loss of disk real estate for storing data.

The features of the thrust bearing ring 36 of FIGS. 1–3 may be formed using laser ablation process techniques. Such techniques provide highly planarized air pad working surfaces.

For each of the three regions of the thrust bearing ring 36 that form air pads, there is an air entry slot 76, 78 and 80 that decreases in cross sectional area in the direction of rotation of the disk stack. This direction of rotation is shown by arrow 82 in FIG. 2. The decrease in cross sectional area of a particular air entry slot 76 may be achieved solely by decreasing the width of the slot 76 in the direction of rotation 82, with a corresponding increase in the width of lapped flat air pad surfaces on opposed sides of the slot 76. However, the preferred embodiment includes a taper ramp zone, indicated by dashed lines 84 in FIG. 2. The combination of the narrowing width and the ramping is designed to achieve a convergence for developing a predictable load supporting film of air. The clearances and trapped volumes should be kept small in order to provide system damping characteristics.

In operation, one of the relieved areas 70, 72 and 74 provides access of a read/write head 24 to the interior portion of the thrust bearing ring, as noted above. The air entry slots 76, 78 and 80 establish pressurizing zones as the disk stack is rotated in the direction indicated by arrow 82 in FIG. 2. As a result, the disk stack is separated from the thrust bearing ring by three air bearings equidistantly spaced about the rotational axis 32. The air pads 64, 66 and 68 provide precision spin axis definition with only a small amount of current draw at the rotational speed.

The thrust bearing ring 36 is shown as being attached to the base member 50 of the assembly housing by a potting material 86. However, other means for fixing the thrust bearing ring in the proper position relative to the rotational axis 32 and the lowermost disk 22 may be utilized. In another embodiment, the thrust bearing ring is formed from the base member itself. That is, the horizontal surface of the base member is machined to form the three air pads 64, 66 and 68. An advantage of this embodiment is that it reduces the complexity of assembling the disk drive, since the proper alignment of the air pads is established during fabrication. However, a separate thrust bearing ring is preferred.

As another alternative, the air pads 64, 66 and 68 are separate units that must be independently attached to the disk drive assembly during the assembly process. This increases the complexity of the assembly process, but does not affect final operation of the aerodynamic thrust bearing during support of the disk stack.

The features of the thrust bearing ring of FIG. 2 may be varied depending upon the implementation. The features of the drawing are not critical to the proper operation of the aerodynamic thrust bearing.

The surface features of the shaft 12 will be described with reference to FIGS. 1, 4 and 5. A central portion of the shaft defines an active journal surface 88. A hydrodynamic journal bearing is achieved by filling the space between the active journal surface 88 and the stationary sleeve 14 with a journal fluid. The journal fluid is preferably a low vapor pressure oil. An acceptable liquid is polyalphaolefin oil sold by W.F. Nye Corp. under the federally registered trademark NYEBAR. Optionally, the journal fluid is electrically conductive to provide a grounding path for the disk drive assembly.

At the opposite ends of the active journal surface 88 are thin portions 90 and 92 that have tapering diameters. Referring to FIG. 1, the tapering end portions form capillary seals that inhibit migration of the journal fluid to areas beyond the interface of the shaft 12 and the stationary sleeve 14. A meniscus will be formed slightly beyond each of two "energy kill" grooves 94 and 96. As the surface of the shaft increases in distance from the surface of the stationary sleeve 14 with distance from the active journal surface 88, surface tension becomes increasingly effective in restricting journal fluid migration. The use of capillary seals to restrict migration is known in the art. However, the energy kill grooves 94 and 96 significantly increase the effectiveness of the capillary seals. As the shaft is rotated relative to the sleeve, hydraulic pressure increases both downwardly and upwardly as a result of features along the active journal surface 88. The energy kill grooves create buffer zones to allow the hydraulic kinetic energy to dissipate, so as not to disturb the capillary seals. The energy kill grooves also facilitate fluid communication among axially extending fluid resupply grooves 98, 100 and 102 that are shown in FIG. 5.

Figure 4:
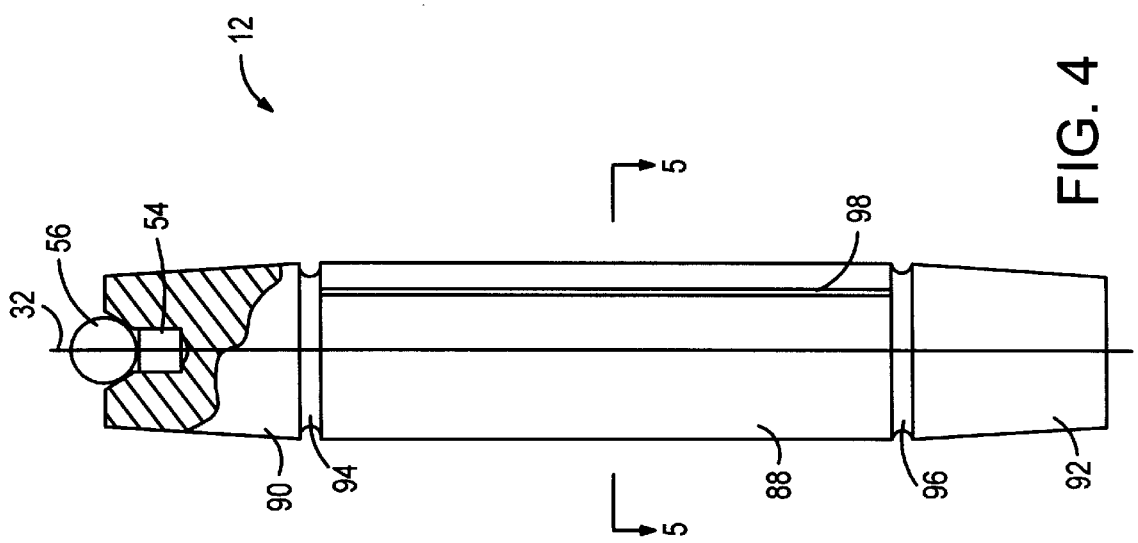
FIG. 4 is a side, partially sectional view of a shaft for use in the disk drive assembly of FIG. 1.

In the embodiment of FIGS. 1 and 4, the capillary seals are formed by tapering the end portions 90 and 92 of the shaft 12. However, this is not critical. In another embodiment, the inside diameter of the stationary sleeve 14 is tapered at regions corresponding to the end portions 90 and 92 of the shaft. In yet another embodiment, both the shaft and the sleeve are tapered to form the capillary seals.

In some applications, the capillary seal at the lower end of the shaft 12 may not be required. If not required, the elimination of the capillary seal reduces the dimensions of the assembly 10 and the cost of manufacturing the assembly. The adherent disk seal 52 or a functionally equivalent seal may be used to provide fluid retention in such applications.

Figure 5:
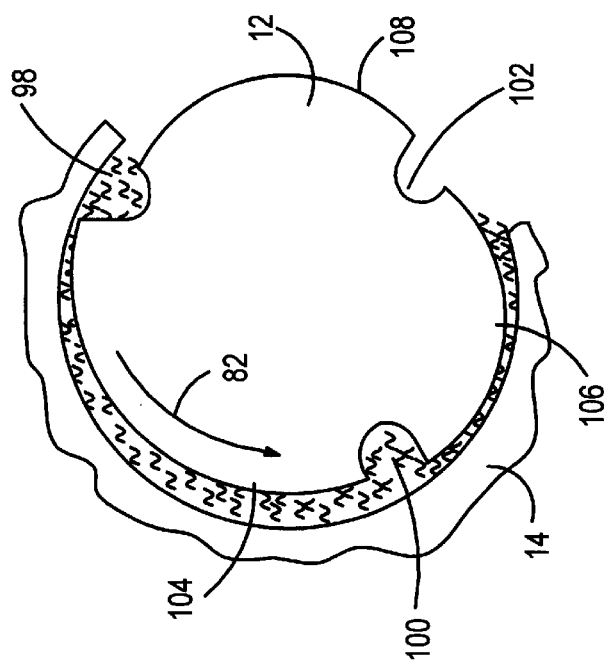
FIG. 5 is a top sectional view of the shaft of FIG. 4 in operation within the disk drive assembly of FIG. 1.

Referring specifically to FIG. 5, the active journal surface of the shaft 12 is machined to include three or more compression ramps 104, 106 and 108. Along each compression ramp, the radius of the shaft 12 decreases in the direction of rotation, as indicated by arrow 82. The compression ramps develop the desired hydrodynamic pressures for coaxially aligning the shaft 12 and sleeve 14, even when the assembly is placed on its side. The pressure is greatest within the narrow gap immediately before the axial resupply grooves 98, 100 and 102. Pressure builds with approach to this narrowest portion of the spacing between the shaft and the sleeve, forcing the fluid downwardly and upwardly, as described above. The increased kinetic energy is dissipated at the kill grooves 94 and 96 of FIGS. 1 and 4. The liquid then recirculates to the entirety of the active journal surface 88 via the resupply grooves. Consequently, there is a continuous flow toward the two energy kill grooves as a result of the operations of the compression ramps and there is a continuous flow away from the energy kill grooves at the three resupply grooves.

Figure 7:
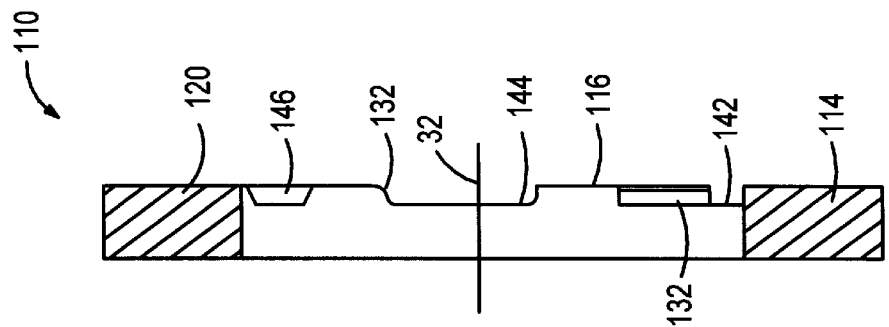
FIG. 7 is a side sectional view of the thrust bearing ring of FIG. 6, taken along lines 7—7.
Figure 6:
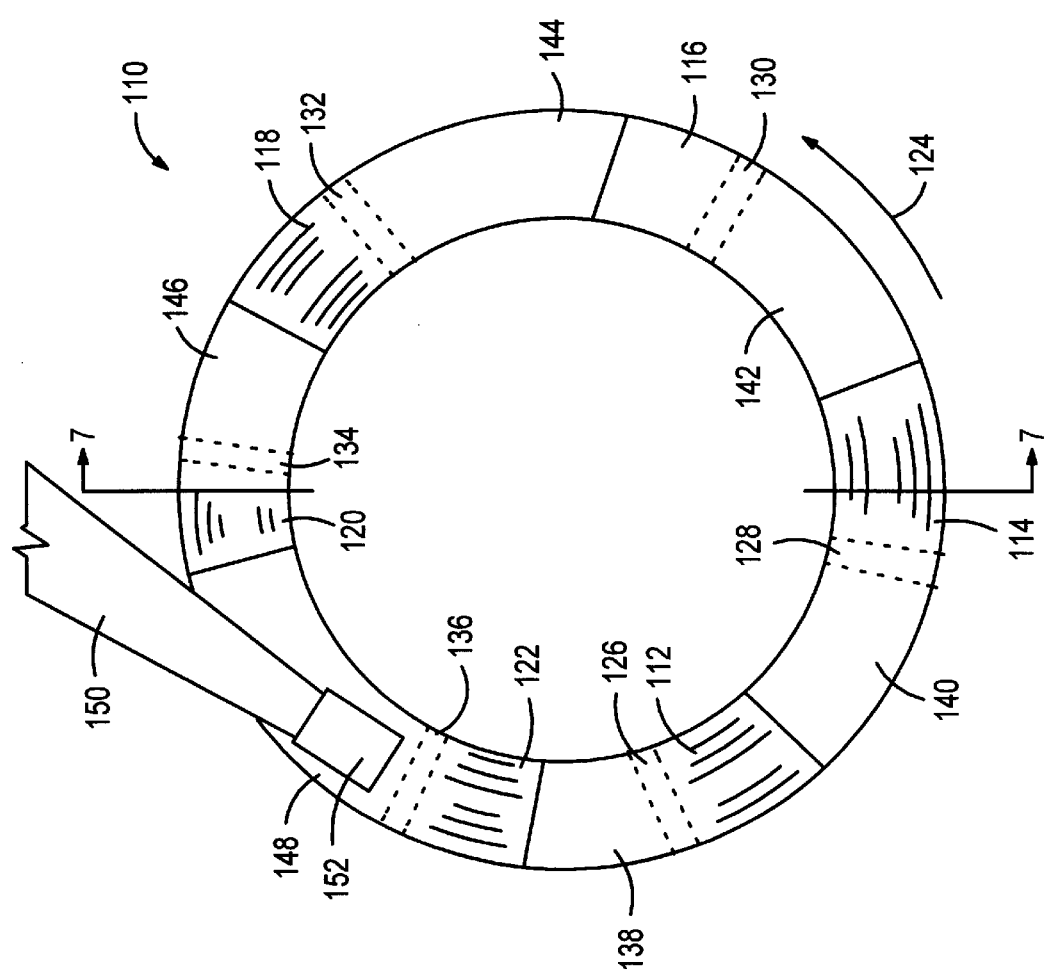
FIG. 6 is a top view of a second embodiment of the thrust bearing ring of FIG. 1.

FIGS. 6 and 7 illustrate a second embodiment of a thrust bearing ring 110 for use in the disk drive assembly of FIG. 1. The thrust bearing ring includes six air pads 112, 114, 116,118, 120 and 122. Immediately in front of each air pad (as viewed from the direction of disk rotation indicated by arrow 124) is a ramp 126,128, 130, 132, 134 and 136 that functions as a pressurizing zone which is configured to increase aerodynamic force for supporting a rotating disk or disk stack. When the rotation is stopped, the lowermost disk reaches a rest condition in which the disk contacts the six air pads.

Between each air pad 112–122 and the pad ramp 126–136 of the following air pad is a relieved area 138, 140, 142, 144, 146 and 148. As best seen in FIG. 6, the relieved areas are not dimensionally uniform. The positions of the air pads are staggered in order to inhibit resonating harmonic frequencies that might otherwise be introduced by the interaction of the disk stack and the thrust bearing ring 110. The relieved area 148 is particularly large in order to accommodate entry of an actuator arm 150 on which the slider 152 of a read/write head is attached. Thus, the read/write head is able to park on the surface of the lowermost disk in the same area as that used for parking the lowermost disk on the air pads. The area budgeted for the disk-to-ring contact is the same area conventionally used to park the read/write heads during periods of inactivity. As a result, there is no negative impact to the drive packaging.

In operation, the combination of the hydrodynamic journal bearing and the aerodynamic thrust bearing allow the disks to "float" when the disks are rotated. As a result, the disk drive assembly of FIG. 1 is subjected to less wear than many prior art disk drives. Moreover, because the planarized surface of the lowermost disk 22 is used in forming the thrust bearing, the assembly utilizes a "free" surface having the required characteristics for defining the plane of rotation for the disk stack itself.

What is claimed is:

1. A disk drive assembly comprising:

a data disk having a rotational axis and having parallel first and second planar surfaces perpendicular to said rotational axis;

a rotary drive connected to said data disk to rotate said data disk about said rotational axis;

at least one thrust bearing adjacent to said first planar surface of said data disk to axially support said data disk, said data disk having a rest position in which said data disk is stationary and said at least one thrust bearing is in contact with said first planar surface, said data disk having an aerodynamically supported position in which said at least one thrust bearing is spaced apart from said first planar surface by an air bearing when said data disk is rotated about said rotational axis; and a support structure said rotary drive and each said thrust bearing being connected to said support structure.

2. The assembly of claim 1 wherein said rotary drive includes a shaft coaxially aligned with said data disk, said shaft having an outer surface that includes an active journal surface, said rotary drive further including a sleeve adjacent to said active journal surface, a first one of said shaft and said sleeve being rotatable about said rotational axis and a second one being stationary, said rotary drive having a journal fluid between said shaft and said sleeve.

3. The assembly of claim 1 wherein each said thrust bearing includes a pressurizing zone and a bearing surface.

4. The assembly of claim 1 wherein said thrust bearings are at least three in number.

5. The assembly of claim 4 wherein said thrust bearings are portions of a unitary annular member having a relieved area between first and second thrust bearings to accommodate passage of a magnetic read head therebetween, said data disk being a magnetic disk.

6. The assembly of claim 1 further comprising a plurality of magnetic read heads and a plurality of second data disks coaxially aligned with said data disk to form a disk stack supported by said at least one thrust bearing, each of said data disks being operatively associated with at least one of said magnetic read heads for the transfer of data.

7. The assembly of claim 2 wherein said shaft is said rotatable first one and said sleeve is said stationary second one, said shaft having tapering portions on opposed sides of said active journal surface, each of said tapering portions having a decreasing diameter with distance from said active journal surface, thereby defining capillary seals for retaining said journal fluid.

8. The assembly of claim 7 wherein said active journal surface defines a plurality of compression ramps in a direction of rotation of said shaft such that a radial dimension of said shaft varies along said compression ramps.

9. The assembly of claim 8 wherein each said compression ramp is separated from adjacent compression ramps by axially extending journal fluid resupply grooves.

10. The assembly of claim 9 wherein said shaft includes a circumferential groove between each said capillary seal and said active journal surface to accommodate flow of said journal fluid.

11. A disk drive assembly comprising:
a housing having an interior region;
a disk stack of coaxially aligned data storage disks, including an outer data storage disk, said disk stack being within said interior region of said housing;
a plurality of fixed air pads connected in fixed relation to said housing and positioned adjacent to an outer planar surface of said outer data storage disk to aerodynamically support said disk stack when said disk stack is rotated, said air pads being in contact with said outer planar surface when said disk stack is stationary;
hydrodynamic means for accommodating rotation of said disk stack, said hydrodynamic means including a shaft extending along the axis of said disk stack, said shaft having a journal surface, said hydrodynamic means further having a sleeve and a journal fluid at an interface of said sleeve with said journal surface of said shaft; and
drive means for generating force to initiate relative movement between said shaft and said sleeve.

12. The assembly of claim 11 wherein said air pads are disposed to contact an axially inner region of said outer planar surface when said disk stack is stationary.

13. The assembly of claim 12 wherein each said air pad includes a bearing surface to contact said outer planar surface and includes a pressurizing zone configured to increase aerodynamic force for supporting said outer data storage disk in spaced relation from said each air pad.

14. The assembly of claim 11 wherein said shaft is rotatable and said disk stack is coupled to said shaft for rotation therewith.

15. The assembly of claim 14 wherein said shaft includes capillary seals at opposed sides of said journal surface and includes fluid resupply grooves extending longitudinally along said journal surface.

16. A method of supporting and driving at least one data storage disk comprising steps of:
coupling said data storage disk to a rotary drive for selectively rotating said data storage disk;
positioning at least one thrust bearing adjacent to a planar surface of said data storage disk such that said planar surface contacts each said thrust bearing when said data storage disk is in a rest position, including attaching each said thrust bearing in a fixed position relative to a housing for containing said data storage disk; and
aerodynamically supporting said data storage disk in spaced relationship to said each thrust bearing when said data storage disk is rotated, including forming an air bearing between said planar surface and said each thrust bearing as a response to relative movement therebetween.

17. The method of claim 16 further comprising a step of forming said rotary drive to include a hydrodynamic journal for rotating a shaft relative to a stationary sleeve, said shaft being coaxial with said data storage disk.

18. The method of claim 16 wherein said step of positioning said at least one thrust bearing includes configuring each said thrust bearing to include a pressurizing zone, thereby increasing aerodynamic pressure to form said air bearing.

19. The method of claim 18 wherein said steps of positioning said at least one thrust bearing and aerodynamically supporting said data storage disk include defining a tilt axis of said data storage disk.

20. The method of claim 17 further comprising a step of providing an activated carbon filter within a housing containing said data storage disk, thereby inhibiting an escape of volatiles from a journal fluid to said data storage disk.

* * * * *